US011995477B2

(12) United States Patent
Keskikangas et al.

(10) Patent No.: US 11,995,477 B2
(45) Date of Patent: May 28, 2024

(54) VERIFICATION OF UPDATED ANALYTICAL PROCEDURES IN MONITORING SYSTEMS

(71) Applicant: Axis AB, Lund (SE)

(72) Inventors: Axel Keskikangas, Lund (SE);
Georgios Efstathiou, Lund (SE)

(73) Assignee: Axis AB, Lund (SE)

( * ) Notice: Subject to any disclaimer, the term of this patent is extended or adjusted under 35 U.S.C. 154(b) by 98 days.

(21) Appl. No.: 17/877,066

(22) Filed: Jul. 29, 2022

(65) Prior Publication Data

US 2023/0077549 A1 Mar. 16, 2023

(30) Foreign Application Priority Data

Sep. 10, 2021 (EP) ..................... 21196087

(51) Int. Cl.
*G06F 9/50* (2006.01)

(52) U.S. Cl.
CPC ............ *G06F 9/5044* (2013.01); *G06F 9/505* (2013.01); *G06F 9/5027* (2013.01)

(58) Field of Classification Search
CPC .. G06F 9/505; G06F 11/3664; G06F 11/3688; G06F 9/5044; G06F 11/3428; G06F 9/5027

See application file for complete search history.

(56) References Cited

U.S. PATENT DOCUMENTS

| | | | | |
|---|---|---|---|---|
| 7,831,325 | B1 * | 11/2010 | Zhang | G06F 11/3409 703/22 |
| 9,501,326 | B2 * | 11/2016 | Nemoto | G06F 11/3433 |
| 10,896,116 | B1 * | 1/2021 | Gabrovski | G06F 11/3664 |
| 2018/0157939 | A1 * | 6/2018 | Butt | G06N 20/00 |
| 2020/0159685 | A1 * | 5/2020 | Askeland | G06F 11/34 |
| 2022/0222486 | A1 * | 7/2022 | Mukherjee | G06F 18/2155 |

(Continued)

FOREIGN PATENT DOCUMENTS

CN 110235138 A 9/2019

OTHER PUBLICATIONS

Extended European Search Report dated Mar. 11, 2022 for European Patent Application No. 21196087.7.

(Continued)

*Primary Examiner* — Abderrahim Merouan
(74) *Attorney, Agent, or Firm* — Volpe Koenig

(57) ABSTRACT

A method for evaluating an updated analytical procedure in a monitoring system, comprising a plurality of monitoring device arranged to monitor similar environments, is provided. The method comprises identifying available processing resources, selecting a first monitoring device for which available processing resources have been identified, selecting a second monitoring device, acquiring monitoring data by the second monitoring device, and performing a current analytical procedure on the monitoring data. The method further comprises sending the monitoring data to the first monitoring device, performing, in the first monitoring device, an updated analytical procedure on the monitoring data, and evaluating the updated analytical procedure based on the outcome of the current analytical procedure and the updated analytical procedure.

20 Claims, 5 Drawing Sheets

(56) References Cited

U.S. PATENT DOCUMENTS

2023/0077549 A1\* 3/2023 Keskikangas ............ G06F 9/505
 345/501

OTHER PUBLICATIONS

Communication pursuant to Article 94(3) EPC for European Patent Application No. 21196087.7, (Apr. 25, 2022).
Zeng et al., "Deep Learning for Scene Classification: A Survey." in Computer Vision and Pattern Recognition (2021).

\* cited by examiner

VERIFICATION OF UPDATED ANALYTICAL PROCEDURES IN MONITORING SYSTEMS

FIELD OF INVENTION

The present disclosure relates to evaluation of updated analytical procedures in a monitoring system comprising a plurality of monitoring devices.

TECHNICAL BACKGROUND

Monitoring systems, comprising a plurality of surveillance/monitoring devices such as for instance cameras, radar devices and audio devices, are commonly used for gaining knowledge about objects and events in a specific surrounding or scene. The monitoring devices of such a multi-device system may be distributed geographically to allow for e.g., detection of unauthorized access and criminal actions, and for tracking movements within the monitored surrounding or scene.

The monitoring data acquired by the monitoring devices is often subject to computer-aided analytical procedures, which are employed for detecting and recognizing objects, sounds, movements and changes in the monitored environment or scene. Preferably, the analytical procedures are defined by software specifically developed for this purpose. The developers of such software are however known to face the problem of testing and validating new releases to determine and correct software faults. A software fault may occur as a result of an error or mistake by the programmer, leading to a bug in the software code. If this fault is executed, in certain situations the system will produce wrong results or even stop working, causing a failure or downtime of the system.

It is therefore common practice to test new developments. Ideally, the new developments are tested under as many combinations of inputs and preconditions as possible. However, a fundamental challenge with software testing is that testing under all combinations of inputs, states and hardware types is generally not feasible, whereby the developers use some strategy to select tests that are feasible for the available time and resources.

One strategy is to let the new version of the software be tested by a selected subset of users, such as a small set of installed monitoring systems. If the performance is satisfactory, the new version can be rolled-out to the remaining users or systems. Even though this strategy may provide some information about the quality of the software under test, it is still difficult to ensure that the testing is sufficient to avoid failure and system downtime and that the selected set of surveillance/monitoring systems is representative for all possible environments and hardware types. Examples of prior art are disclosed in US 2020/0159685 A1, which relates to a coordinated component interface control framework for deterministically reproducing behavior of a data processing pipeline, and in U.S. Pat. No. 10,896,116 B1, which relates to detection of performance regressions in software used to control autonomous vehicles.

SUMMARY

Providing methods for evaluating an updated analytical procedure in a monitoring system comprising a plurality of monitoring devices, which overcome or mitigate at least some of the issues in known methods would be beneficial.

The disclosure is defined by independent claims 1, 12 and 15. Hence, according to a first aspect, a method for evaluating an updated analytical procedure in a monitoring system is provided, wherein the system comprises a plurality of monitoring devices, of which at least some are arranged to monitor similar environments. The method comprises the following:

identifying available processing resources in the monitoring system;

selecting a first monitoring device out of the plurality of monitoring devices for which available processing resources have been identified;

selecting a second monitoring device out of the plurality of monitoring devices;

acquiring monitoring data by the second monitoring device;

performing a current analytical procedure on the monitoring data, thereby producing a first result;

sending the monitoring data to the first monitoring device;

performing, in the first monitoring device, an updated analytical procedure on the monitoring data, thereby producing a second result;

calculating, based on the first result, a first performance value indicating a performance of the second monitoring device when performing the current analytical procedure;

calculating, based on the second result, a second performance value indicating a performance of the first monitoring device when performing the updated analytical procedure; and evaluating the updated analytical procedure based on a comparison between the first performance value and the second performance value.

Several advantages are associated with the present aspect. First, by selecting a monitoring device based on available processing resources for performing the updated analytical procedure, excess resources can be efficiently used for the evaluation. This allows for the evaluation to be performed at a reduced impact on the overall performance of the system. Second, using the first monitoring device to perform the updated analytical procedure on monitoring data acquired by the second monitoring device allows for the updated analytical procedure to be evaluated without disturbing or affecting the operation of the second monitoring device. Thus, the first monitoring device, which may have more available resources than the second monitoring device, can be utilized to evaluate the updated analytical procedure without burdening the second monitoring device. Third, the evaluation can be considered valid for some or all monitoring devices that are arranged to monitor similar environments as the second monitoring device. In different words, the present aspect allows for an update to be tested in a first monitoring device, using monitoring data acquired by a second monitoring device, before the update is rolled out to the second monitoring device and/or other monitoring devices monitoring the same or a similar environment as the second monitoring device.

By evaluation of the updated analytical procedure is generally meant executing the analytical procedure with the intent of finding failures and verifying that it is fit for use. More particularly, this may involve verifying that no errors have been added to the updated version, and further that the performance of the analytical procedure is not impaired. As discussed in more detail in the following, the performance of the analytical procedure may in some examples refer to the performance of the procedure per se, i.e., the quality of the outcome of the procedure in terms of accuracy and reliability, and in some examples the utilized processing resources or time.

The monitoring system may be used for keeping an environment, such as a geographical location or area, under surveillance or observation. The terms surveillance and monitoring may be used interchangeably in the present disclosure.

By environment (or scene) may be understood any physical place, region, or space as it is monitored or "seen" by a monitoring device. Two monitoring devices monitoring the same (or at least partly the same) physical place may hence acquire monitoring data representing environments which may be slightly different (e.g., due to different viewing angles and viewing distances) but still considered similar, as they (at least partly) originate from the same physical location, i.e., the same geographical area or space. In particular, an environment may be a scene as imaged by a monitoring camera of a monitoring system, or a region monitored by a radar- or audio device of a radar- or audio system, respectively. The plurality of monitoring devices may in some implementations be distributed geographically and arranged to monitor the same physical location or object, or at least partly overlapping portions of the same, from different positions or angles. The environments may therefore be considered as similar, as observed by the respective monitoring devices. Alternatively, the plurality of monitoring devices may monitor different physical locations, objects, or audio environments. In this case "similar environments" may be understood as locations or objects, as monitored by the monitoring devices, fulfilling a similarity requirement. Specific types of monitored environments, such as an indoor environment or an outdoor environment, could for example be considered similar. Specific types of monitored indoor environments or outdoor environments, such as office environments, elevators, stairs, parking lots, driveways and the like may also be considered as similar. The similarity may for example be determined using a scene classification method aiming at classifying a monitored region, or an image of such region, to one of a plurality of predefined scene categories. Examples of such methods are, for example, described by D. Zheng et al., "Deep Learning for Scene Classification: A Survey", in *Computer Vision and Pattern Recognition*, 2021. Thus, in an example, environments classified as "elevator" may be considered similar, as well as environments classified as "emergency exit" and "library", respectively. The scene classification may further be associated with an optical characteristics, referring to for instance illumination, as well as view angle and elevation from which the environment is monitored. Hence, the classification "elevator" with the added characteristics "backlight" may define environments comprising backlit elevators as similar.

As similar reasoning may be applied to monitored objects, wherein monitored environments comprising specific categories or types of objects, such as for example doors, cars, and showcases may be considered as fulfilling a similarity requirement. In case the monitoring system is an audio system, the term "similar environment" may in some examples be understood as monitored audio environments or acoustic environments (sometimes referred to as soundscapes), or a set of acoustic resources, sharing certain common features. Two audio environments may for example be considered similar in case they have similar acoustics or in case the sound originates from similar sources.

As an alternative, or addition to the above, it will be appreciated that environments or scenes may be defined as similar by an operator or installer.

In case the monitoring system comprises a camera system or a radar system, the monitored environment may in some examples be referred to as a scene. A scene may be understood as any physical area or space whose size and shape are defined by the field of view (FOV) of a camera or a radar device.

The monitoring data may be understood as set of data describing certain characteristics or properties associated with the monitored environments. The monitoring data may for example be acquired by a camera (for instance in case the monitoring system comprises a camera system), a radar device (for instance in case the monitoring system comprises a radar system) or an audio device (for instance in case the monitoring system comprises an audio system), and may thus comprise optical information, radio wave information, or acoustic information, respectively. The monitoring data may in some examples be acquired at a specific point in time (such as a single image, in case of a camera system), or continuously during a certain time period (such as a video sequence or audio stream).

The available processing resources may be identified by monitoring actual processor utilization or processor load. Alternatively, or additionally available processing resources may be estimated, for example based on historical data or a known utilization pattern. Further, the available processing resources may refer to current or future processor utilization. In case of the latter, the updated analytical procedure may be scheduled to be performed at a later point in time when the processing resources are determined or estimated to be available. In some examples, the available processing resources may be defined as periods in time where there is no or little of interest in the monitored environment, or where the physical location is less crucial to monitor. This may, for example, be understood as a less eventful period of time.

The analytical procedure may be understood as executable logic routines (e.g., lines of code, software programs, etc.), defining a method that a processing unit, e.g., a processor, can carry out in order to determine information about the monitoring data. The information may for example refer to a recognized object or sound in the monitored environment, or a motion, event or action occurring in the monitored environment. The analytical procedure may hence involve for instance object detection, object tracking, object identification, object reidentification, object masking, action recognition, and motion detection based on monitoring data acquired by for instance a camera system or a radar system. The analytical procedure may further involve speech detection, gunshot detection, sound triangulation, aggression detection and speech detection, based on monitoring data acquired by for instance an audio system. The outcome of the analytical procedure may be referred to as a result. The result of the current and the updated analytical procedures may be analyzed to evaluate and validate the updated analytical procedure on the monitoring data.

As already mentioned, the first performance value and the second performance value may indicate the time it takes to carry out the current and updated analytical procedure, respectively. In further examples, the performance values may indicate a power consumption, i.e., the power (e.g., in terms of watts) utilized by the respective monitoring devices, processor or the entire system, when executing the current and the updated procedures, respectively. The performance values may further relate to the utilized processing resources for performing the analytical procedures.

This data—time consumption, utilized power resources or utilized processing resources—may be used as input when evaluating the updated analytical procedure. An increase in any of these measures may indicate that the updated analytical procedure is impaired in relation to the current analytical procedure.

Alternatively, or additionally, the first performance value and the second performance value may indicate an accuracy or reliability of the current analytical procedure and the updated analytical procedure, respectively. The performance value may for example relate to the ability to correctly recognize objects, actions, or sounds in the monitored environment, and the evaluation of the updated analytical procedure may serve the purpose of ensuring that the performance is not impaired by replacing the current analytical procedure with the updated analytical procedure.

Generally, the idea is to utilize the first monitoring device, for which available processing resources have been identified, to execute the (possibly resource consuming) updated analytical procedure on the monitoring data. It will however be appreciated that the remaining calculations and operations, such as the current analytical procedure, the calculation of the first and second performance values and the comparing of the two, may be performed elsewhere, e.g., by the second monitoring device or by a remotely located processor (also referred to as a central processor or central circuitry) depending on, inter alia, the architecture of the monitoring system and the available processing resources in general. Hence, the current analytical procedure may be performed either by the second monitoring device or by a central processing unit having the current analytical procedure installed. Further, the calculation of the first and second performance values, based on the results from the current and updated analytical procedures, respectively, may be performed by the first monitoring device, the second monitoring device or the central processing unit.

Thus, in an embodiment, the second monitoring device may perform the current analytical procedure on the monitoring data and send the first result to the first monitoring device which calculates the first performance value. The first monitoring device may further calculate the second performance value based on the second result.

In another embodiment, the first monitoring device may send the second result to second monitoring device, which may calculate the first performance value and the second performance value.

As indicated above, the evaluation of the updated analytical procedure, comprising a comparison between the first performance value and the second performance value, may be performed by one of the first and second monitoring devices, or by a central processor to which the first and second performance values may be sent from the monitoring device performing the calculation of the respective performance value.

In case the evaluation indicates an improvement, or at least that the updated analytical procedure meets specifications and requirements so that it fulfils its intended purpose, the updated analytical procedure may be sent to the second monitoring device and/or other monitoring devices, such as a third monitoring device, arranged to monitor the same environment or environments similar to the environments monitored by the second monitoring device. In different words, the updated analytical procedure may be rolled out to one or several of the remaining monitoring devices in the monitoring system after having been verified and validated in the first monitoring device. The updated analytical procedure may be considered verified and validated for all monitoring devices of the system monitoring the same, or similar environment as the one monitored by the second monitoring device. As will be discussed further below, the monitoring devices monitoring the same or a similar environment may preferably be of a similar hardware type so as to further increase the reliability of the validation.

The transmission of the updated analytical procedure, or upgrade, may be performed automatically as soon as the evaluation is finished, at a predetermined or scheduled point in time, or manually upon request by a user.

In case the evaluation shows that the updated analytical procedure does not meet the specifications and requirements, the updated analytical procedure may be rolled back from the first monitoring device and replaced, e.g., with the current analytical procedure, so as to not disturb the subsequent operation of the first monitoring device.

The first monitoring device may be selected as the one, out of the plurality of monitoring devices of the system, determined to have sufficient processing resources for performing (and possibly evaluating) the updated analytical procedure. The required resources may be included as a specification or request submitted with the updated analytical procedure, for example by the developer or entity providing the update or be estimated based on the resources required for performing the current analytical procedure. In a further example, the utilized processing resources may be monitored during the execution of the updated analytical procedure and used as input for future updates.

Preferably, the first monitoring device and the second monitoring device may be of a similar type so as to ensure that the evaluation of the updated analytical procedure in the first monitoring device is valid also for the second monitoring device. This also applies to other monitoring devices to which the updated analytical procedure is to be evaluated. The monitoring devices may thus be similar, of a similar type, or comprise a similar hardware. More specifically, similar monitoring devices may comprise a similar mechanism or type of mechanism for performing the analytical procedure. Similar monitoring devices, such as for instance the first monitoring device and the second monitoring device, may for example comprise a similar hardware being a hardware accelerator, a central processing unit (CPU), or a graphics processing unit (GPU) performing the analytical procedure. Examples of hardware accelerators include neural network (NN) accelerators, neural processors, deep learning processors (DLP) and artificial intelligence (AI) accelerators.

The analytical procedure may be performed by a deep learning approach, which may be understood as a type of machine learning that may involve training a model, usually referred to as a deep learning model. The analytical procedure may hence be performed using a deep learning model that is configured and trained to perform the analytical procedure at hand. Seen on a general level, an input to such a deep learning model may be surveillance or monitoring data, such as image data, radar data or audio data, that is to be analysed and the output may be a tensor that represents confidence scores for one or more analytical results for the surveillance data on a datum level. In case the surveillance data is image data and the analytical procedure is an object detection procedure, the output tensor may represent confidence scores for one or more object classes for the image data on a pixel level. In other words, the deep learning model may determine, for every pixel, the probability of the pixel depicting an object of each of one or more object classes.

An analytical procedure may be considered updated after the deep learning model has been trained. The training may for example be motivated by access to new input data. The analytical procedure may further be considered updated in case the deep learning framework, which may be used for designing, training, and interacting with the deep learning model as well as with the hardware, has been modified or updated. This may for example be the case if a framework provider releases a new version of the deep learning framework. A change in deep learning framework may in some examples motivate a new training of the deep learning model. The updated analytical procedure may hence be understood as at least one of the deep learning model and the deep learning framework being updated, or at least different, compared to the deep learning model and the deep learning framework of the current analytical procedure. Thus, the updated analytical procedure may according to some examples be performed using a deep learning model operating in a deep learning framework, wherein at least one of the deep learning model and the deep learning framework is updated.

It will be appreciated that the monitoring system, or surveillance system, in some implementations may be or comprise a camera system arranged to view similar scenes. Thus, the first monitoring device may comprise a first camera and the second monitoring device a second camera. Further, the monitored environment(s) may be a scene which, in some examples, may be defined by at least partly overlapping fields of view of the cameras. The monitoring data may hence comprise an image or an image stream captured by the second camera.

The monitoring system may further comprise a light detection and ranging (LIDAR) system, employing laser for determining ranges and imaging the environments.

In some implementations the monitoring system may be or comprise a radar system, comprising a first radar device being the first monitoring device and a second radar device being the second monitoring device. The monitoring data may in such cases comprise radio wave information.

Further, in some implementations the monitoring system may be, or comprise, an audio system for monitoring sounds in the environment. The first monitoring device may hence comprise a first audio device, the second monitoring device a second audio device, and the monitoring data a sound information captured by the second audio device.

According to a second aspect an evaluation system is provided, configured to evaluate an updated analytical procedure in a monitoring system, such as a camera system, a radar system or an audio system comprising a plurality of monitoring devices, of which at least some are arranged to monitor similar environments. The evaluation system comprises circuitry configured to execute:
  an identifying function configured to identify available processing resources in the monitoring system,
  a selecting function configured to select a first monitoring device out of the plurality of monitoring devices for which available processing resources have been identified, and further to select a second monitoring device out of the plurality of monitoring devices, and
  a monitoring data acquiring function configured to acquire monitoring data using the second monitoring device. The circuitry is further configured to execute:
  a monitoring data sending function configured to send the monitoring data to the first monitoring device,
  an analytical procedure performing function configured to perform a current analytical procedure on the monitoring data, thereby producing a first result, and further to perform an updated analytical procedure on the monitoring data, using the first monitoring device, thereby producing a second result,
  a calculating function configured to calculate, based on the first result, a first performance value indicating a performance of the second monitoring device when performing the current analytical procedure, and further to calculate, based on the second result, a second performance value indicating a performance of the first monitoring device when performing the updated analytical procedure, and
  an evaluating function configured to evaluate the updated analytical procedure based on a comparison between the first performance value and the second performance value.

According to a third aspect, a non-transitory computer-readable medium is provided, having stored thereon computer code instructions adapted to carry out the method of the first aspect when executed by a device having processing capability, such as the circuitry discussed in connection with the second aspect.

The above-mentioned optional additional features of the method according to the first aspect, when applicable, apply to these second and third aspects as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular acts of the methods described as such methods may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps

BRIEF DESCRIPTION OF THE DRAWINGS

The above and other aspects of the present disclosure will now be described in more detail, with reference to the appended figures. The figures should not be considered limiting but are instead used for explaining and understanding the disclosure as defined in the appended claims. Like reference numerals refer to like elements throughout.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Rather, these embodiments are provided for thoroughness and completeness, and to convey the scope of the disclosure, as defined in the appended claims, to the skilled person.

Figure 1:
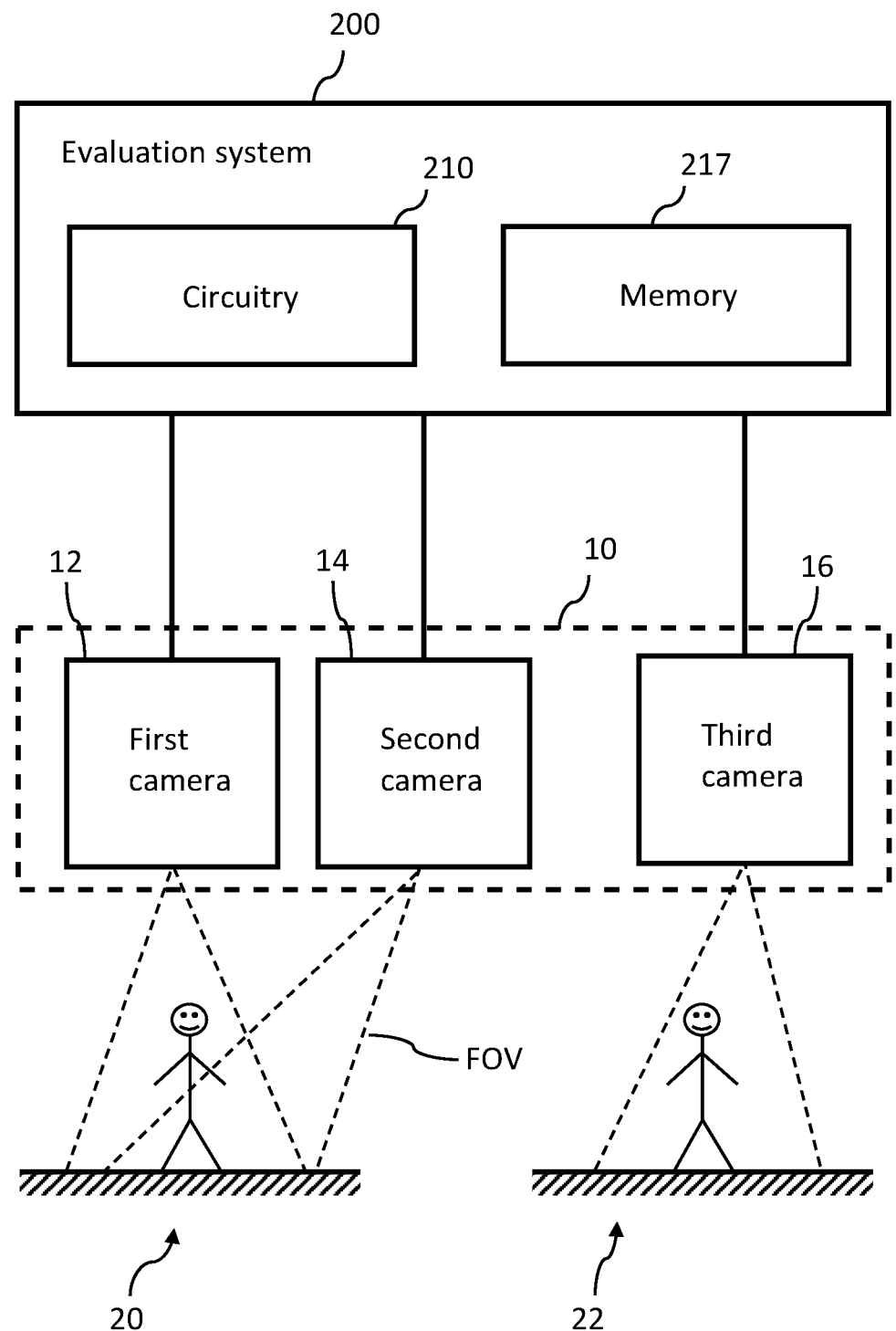
FIG. 1 shows an example evaluation system for evaluating an updated analytical procedure in a monitoring system according to some embodiments.

FIG. 1 illustrates an embodiment of the present disclosure, comprising an evaluation system 200 which may be used for testing and validating an updated analytical procedure, such as a computer-aided method for recognizing objects or actions in a same or similar physical locations monitored by a monitoring system 10. The updated analytical procedure is evaluated on a selected monitoring device 12 identified to have available processing resources. In case the evaluation of the updated analytical procedure is successful, the update may be rolled out to other monitoring devices 14, 16 of the system 10.

It will be appreciated that the monitoring system 10 may comprise, or be, for instance a radar system, an audio system, or a camera system. In the following description of FIG. 1, an exemplary embodiment comprising a camera system 10 is disclosed. The camera system 10 comprises a plurality of cameras 12, 14, 16. In the present example, all three cameras 12, 14, 16 can be considered to monitor similar environments or scenes. The first camera 12 and the second camera 14 are monitoring the same three-dimensional space 20, or physical location, from slightly different angles and positions, with at least partly overlapping fields of view FOV. The respective scenes, as captured by the first and second camera 12, 14 may hence be slightly different in terms of viewing angle but still considered similar in terms of common descriptors (i.e., features). The third camera 16 monitors a different three-dimensional space 22, but the resulting scene (or image) captured by the third camera 16 may be considered similar to the scenes captured by the first and second cameras 12, 14, given that the two monitored physical locations 20, 22 belong to the same classification and/or share a set of common features.

However, it will be appreciated that the first camera 12 in alternative configurations may be arranged to monitor an environment that is dissimilar from the environment monitored by the second 14 camera. In such configurations, the first camera 12 may primarily be employed for its available processing resources, which may be used for performing the updated analytical procedure.

The evaluation system 200 comprises circuitry 210 configured to execute functions of the evaluation system 200, i.e., functions corresponding to method steps as will be described in relation to FIGS. 2A and 2B. Further, the evaluation system may comprise, or be communicatively connected to, a non-transitory computer-readable medium, or memory 217, storing computer code instructions for carrying out the above-mentioned method steps. The evaluation system 200 may in some implementations be distributed between one or several of the monitoring devices 12, 14, 16, or be structurally separated from the monitoring system 10. In case of the latter, the evaluation system 200 may be arranged remotely from the monitoring system 10 and may thus be referred to as a central evaluation system 200, comprising central processing unit or central circuitry.

Figure 2A:
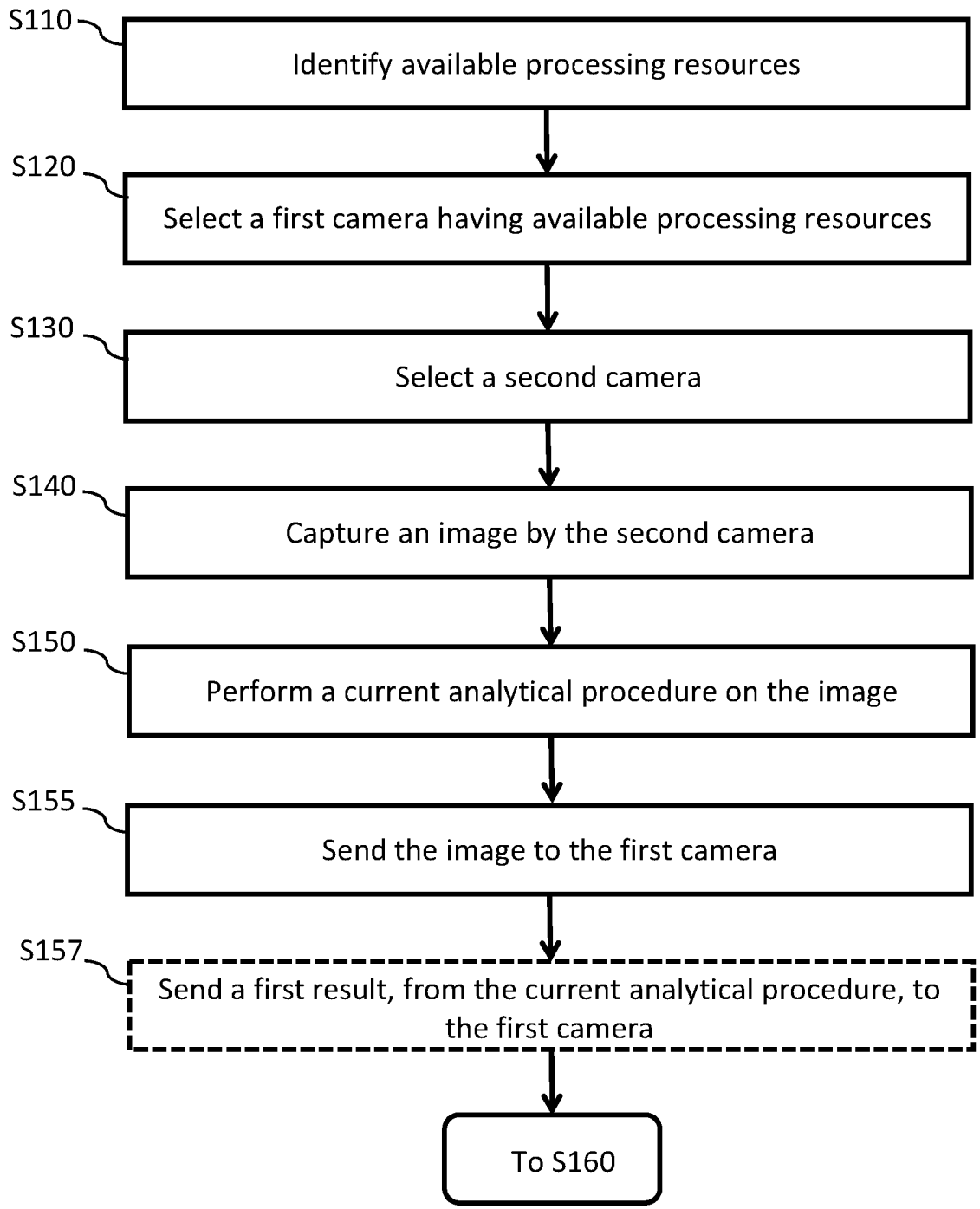
FIGS. 2A and 2B are flow charts of embodiments of a method for evaluating an updated analytical procedure in a monitoring system comprising a plurality of monitoring devices.
Figure 2B:
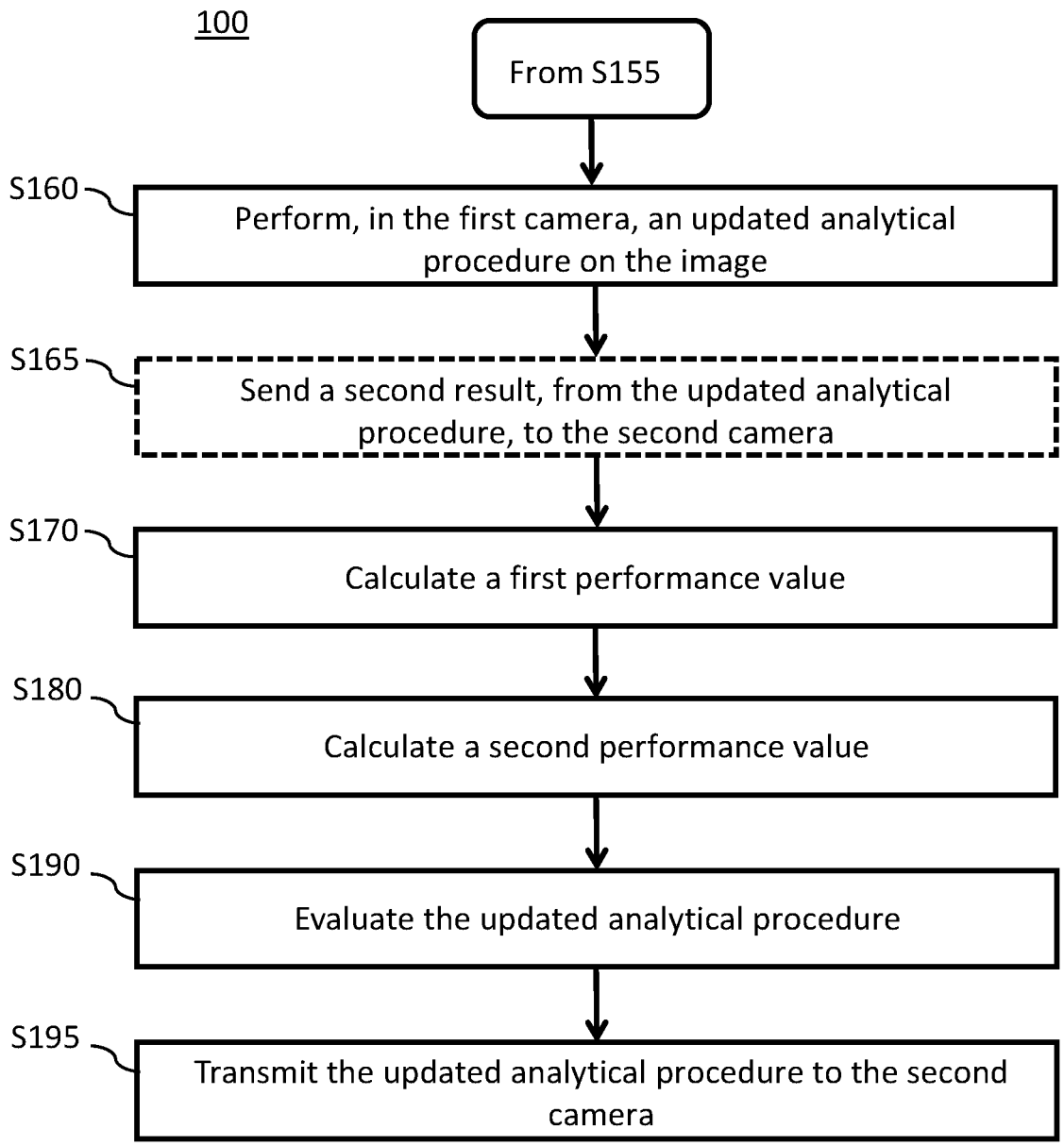

FIGS. 2A and 2B show a flow chart of embodiments of a method 100 for evaluating an updated analytical procedure as mentioned above, i.e., in a surveillance or monitoring system comprising a plurality of monitoring devices of which at least some are arranged to image similar scenes. In the following, the monitoring system will be exemplified by a camera system comprising at least a first camera 12 and a second camera 14 as illustrated in FIG. 1.

The method 100 comprises the act of identifying S110 available processing resources in the camera system, e.g., by monitoring actual processor utilization or by estimating the processor utilization based on historical data, with the purpose of identifying and selecting a first camera suitable for performing the updated analytical procedure. The available processing resources may further be identified as a period in time during which it is of less importance to monitor a specific scene. As a specific, illustrating example a scene comprising a railway platform may be considered. A period of less importance may in this case be represented by the period directly after a train has left the railway platform, and up to the next train is arriving. During this period the risk of accidents may be determined to be relatively low, whereby it may be less crucial (from a safety point of view) to monitor the scene.

Once the available processing resources are identified S110, a first camera, having the available processing resources, is selected S120. Preferably the camera having sufficient available or excess resources for executing the updated analytical procedure may be selected S120 as the first camera.

The method 100 further comprises selecting S130 a second camera out of the plurality of cameras. The second camera may for instance be a camera for which a need for an upgrade of the current analytical procedure has been identified. The second camera may for example exhibit an impaired performance compared to other cameras in the system. This second camera may be used for capturing S140 an image, which may be sent S155 to the first camera. In the present example, a current analytical procedure may be performed S150 on the image by the second camera. It will however be appreciated that the current analytical procedure in some examples may be performed by another entity, such as a central processing unit or the first camera as well.

The outcome of the current analytical procedure may be referred to as a first result, which for example may comprise information about a recognized object or action in the image.

Referring to FIG. 2B, once received at the first camera, the image is analyzed by the updated analytical procedure, which is performed S160 to produce a second result. Similar to above, the second result may comprise information about the recognized object or action in the image.

The first result is used for calculating S170 a first performance value, indicating a performance of the second camera when performing the current analytical procedure. The first performance value may for example be considered a quality measure quantifying the accuracy or reliability of the current analytical process, or a measure indicating the processor utilization or time consumption for executing the current analytical process.

Similarly, the second result is used for calculating S180 a second performance value, which for the updated analytical process may indicate the similar measures as for the current analytical process described above. The calculations S170, S180 may be performed at the first camera or the second camera, or at a centrally located processing unit such as a central processor. In one example shown in FIG. 2A, the first result is optionally sent S157 to the first camera, which may calculate S170 the first performance value. Further, as illustrated in FIG. 2B, the second result may optionally be sent S165 to the second camera which may calculate S180 the second performance value.

Since both the current and the updated analytical process have been performed on the same image, taken by the second camera, the updated analytical procedure is evaluated S190 by comparing the first performance value and the second performance value. The evaluation may for example take into consideration the time it takes to carry out the current and updated analytical procedure, respectively. In further examples, the performance values may indicate a power consumption utilized when executing the current and the updated analytical procedures, respectively. The outcome of the evaluation may for instance be an indication of an improvement, or at least that the updated analytical procedure meets specifications and requirements so that it fulfils its intended purpose. Preferably, the first and the second camera (and possible further cameras, such as all cameras, of the camera system) may be of the same or a similar hardware type, i.e., comprise a same or similar type of hardware for performing the analytical procedure, so as to make the performance of the updated analytical procedure on the first camera even more representative for the second (and further) camera(s) of the camera system.

The method may therefore comprise the further act of transmitting S195 the updated analytical procedure to the second camera, given that the evaluation indicates an improvement, or that the updated analytical procedure fulfils the specifications and requirements associated with the analytical procedure. The requirements and specifications may be defined on a case-by-case basis, for example by an installer or operator, depending on other and overall requirements on the monitoring system.

Figure 3:
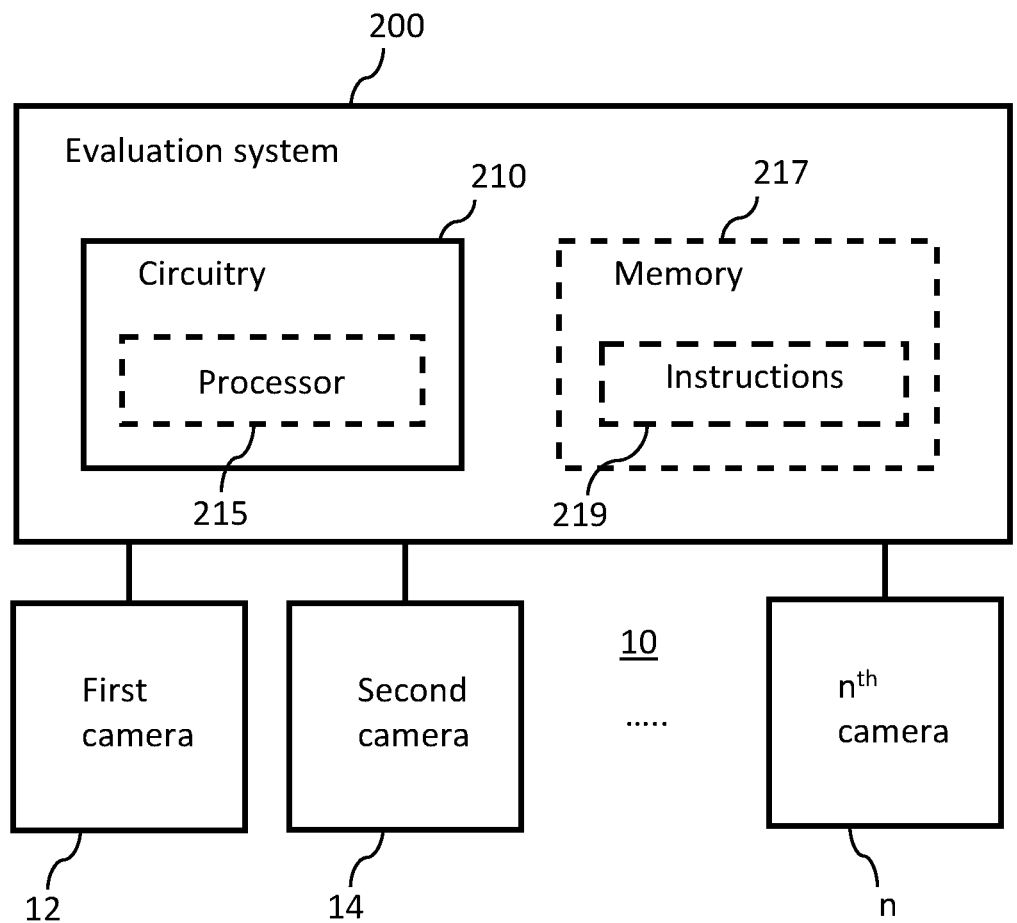
FIG. 3 shows an exemplary system according to an embodiment of the present disclosure.

FIG. 3 is a schematic block diagram of embodiments of an evaluation system 200 for evaluating an updated analytical procedure in a monitoring system comprising for instance a camera system as described above, a radar system, a lidar system or an audio system. The evaluation system 200 comprises circuitry 210 configured to execute functions of the evaluation system 200, e.g., functions corresponding to method steps as described in relation to FIGS. 2A and 2B. The circuitry 210 may include a processor 215, such as a central processing unit (CPU), microcontroller, or microprocessor. The evaluation system 200 may further comprise a non-transitory computer-readable storage medium, such as a memory 217. The memory 217 may be one or more of a buffer, a flash memory, a hard drive, a removable media, a volatile memory, a non-volatile memory, a random access memory (RAM), or another suitable device. In a typical arrangement, the memory 217 may include a non-volatile memory for long term data storage and a volatile memory that functions as system memory for the circuitry 217. The memory 217 may exchange data with the circuitry 210 over a data bus. Accompanying control lines and an address bus between the memory 217 and the circuitry 210 may also be present. The memory may comprise instructions 219 in the form of program code configured to carry out the functions of the evaluation system 200 when executed by the processor 215. The functions of the evaluation system 200 may for example be identifying available processing resources in a monitoring system, such as a camera system 10, selecting a first monitoring device, such as a first camera 12, out of the plurality of monitoring devices for which available processing resources have been identified, selecting a second monitoring device, such as a second camera 14 out of the plurality of monitoring devices, acquiring monitoring data, such as an image, using the second camera 14, sending the image to the first camera 12, performing a current analytical procedure on the image to produce a first result, performing an updated analytical procedure on the image, using the first camera 12, to produce a second result, calculating a first performance value based on the first result, calculating a second performance value based on the second result, and evaluating the updated analytical procedure based on a comparison between the first performance value and the second performance value.

The cameras 12, 14 of the camera system 10 may in some examples form part of the evaluation system 200. In other examples, the cameras 12, 14 of the camera system 10 may be structurally separated from the evaluation system 200. In case of the latter, the evaluation system 200 may be arranged remotely from the camera system 10. In further examples, the evaluation system 200, or parts of the evaluation system 200, may be distributed over the camera system 10, such as in the first and second cameras 12, 14, and/or a remote location.

Figure 4:
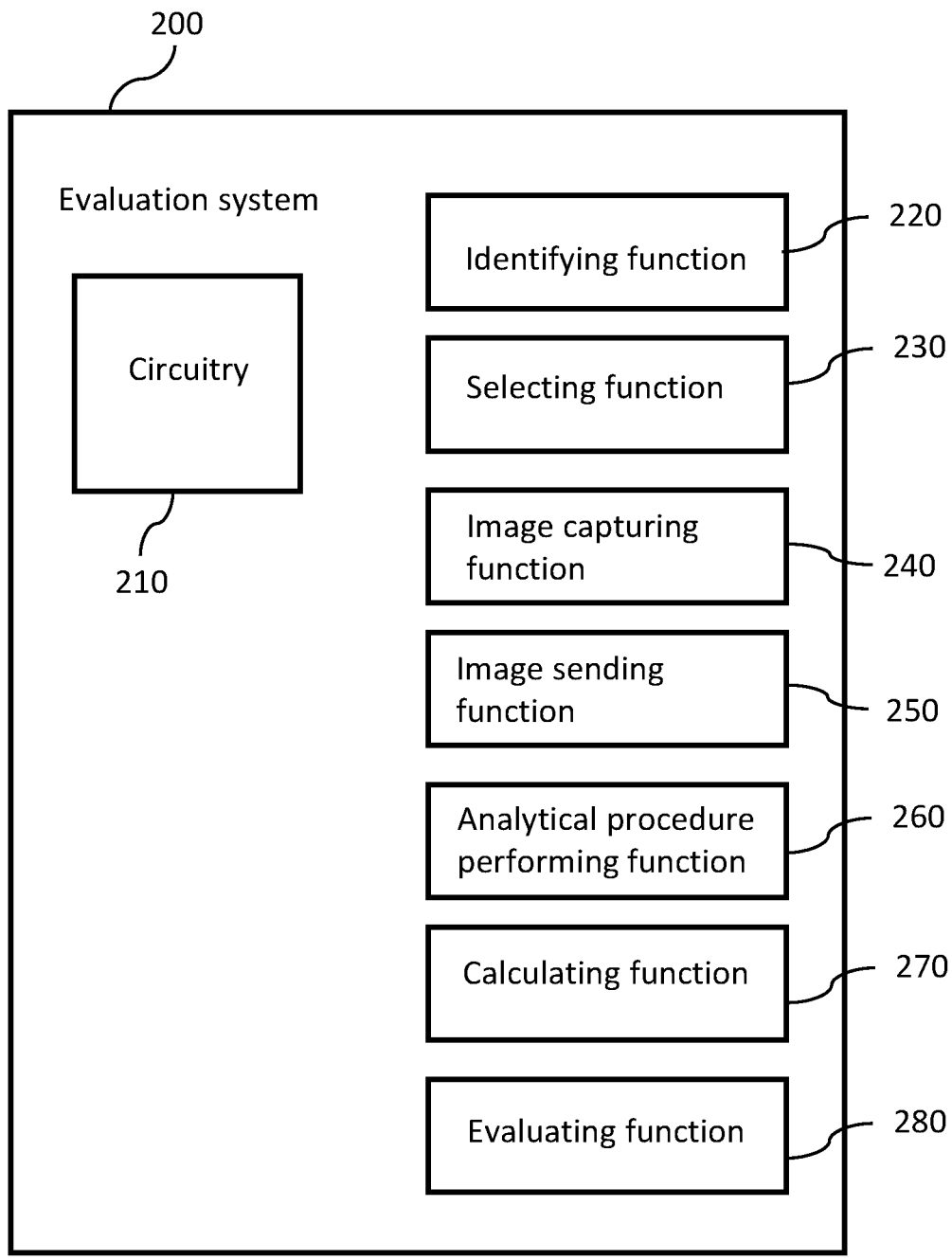
FIG. 4 shows an exemplary system according to another embodiment of the present disclosure.

FIG. 4 is a schematic block diagram of embodiments of an evaluation system 200, which may be similarly configured as the evaluation system discussed above in connection with FIG. 3. As indicated in FIG. 4, the circuitry 210 is configured to execute at least an identifying function 220, a selecting function 230, an image capturing function 240, and image sending function 250, an analytical procedure performing function 260, a calculating function 270, and an evaluating function 280.

The analytical procedure performing function 260 may employ a deep learning approach, which may be understood as a type of machine learning that may involve training a model, often referred to as a deep learning model. The deep learning model may be based on a set of algorithms that are designed to model abstractions in data by using a number of processing layers. The processing layers may be made up of non-linear transformations, and each processing layer may transform the data before passing the transformed data to a subsequent processing layer. The transformation of data may be performed by weights and bias of the processing layer. The processing layers may be fully connected. Deep learning models may include, as an example and not by way of limitation, neural networks and convolutional neural networks. Convolutional neural networks may be made of up a hierarchy of trainable filters, interleaved with non-linearities and pooling. Convolutional neural networks may be used in large-scale object recognition tasks.

The deep learning model may be trained in a supervised or unsupervised setting. In a supervised setting, the deep learning model is trained using labelled datasets to classify data or predict outcomes accurately. As input data are fed into the deep learning model, the model adjusts its weights until the model has been fitted appropriately, which occurs as part of a cross validation process. In an unsupervised setting, the deep learning model is trained using unlabelled datasets. From the unlabelled datasets, the deep-learning model discovers patterns that can be used to cluster data from the datasets into groups of data having common properties. Common clustering algorithms are hierarchical, k-means, and Gaussian mixture models. Thus, the deep learning model may be trained to learn representations of data.

The input to the deep learning model may thus be surveillance or monitoring data, such as, in the present example indicated in FIG. 4, image data from camera devices of a camera system.

There exist many different deep learning networks that are suitable for performing analytical procedures on surveillance data and the detailed form of input and output, i.e., which format is required for the input data and which format the output tensor has, can vary between these networks. The output from the deep learning model may be interpreted using a thresholding technique in which the tensor output from the deep learning model is interpreted by setting a confidence score threshold for each analytical result, e.g., for each class or category. The threshold sets the minimum confidence score that is required for a datum to be interpreted as a certain analytical result, e.g., as belonging to a certain object class in case the analytical procedure is an object detection procedure.

The analytical procedure may be considered updated after the deep learning model has been trained, for example, in response to access to new input data. The analytical procedure may further be considered updated by updating or modifying the deep learning framework used for designing, training and interacting with the deep learning model.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method for evaluating an updated version of an analytical procedure in a monitoring system comprising a plurality of monitoring devices, wherein at least some monitoring devices of the plurality of monitoring devices are arranged to monitor similar environments, the method being characterized by:
identifying available processing resources in the monitoring system;
selecting a first monitoring device out of the plurality of monitoring devices for which available processing resources have been identified;
selecting a second monitoring device out of the plurality of monitoring devices;
acquiring monitoring data by the second monitoring device;
performing a current version of the analytical procedure on the monitoring data, thereby producing a first result;
sending the monitoring data to the first monitoring device;
performing, in the first monitoring device, an updated version of the analytical procedure on the monitoring data, thereby producing a second result;
calculating, based on the first result, a first performance value indicating a performance of the second monitoring device when performing the current version of the analytical procedure;
calculating, based on the second result, a second performance value indicating a performance of the first monitoring device when performing the updated version of the analytical procedure; and
evaluating the updated version of the analytical procedure based on a comparison between the first performance value and the second performance value.

2. The method according to claim 1, wherein the first performance value and the second performance value indicate a time, utilized power resources or utilized processing resources for performing the current version of the analytical procedure and the updated version of the analytical procedure, respectively.

3. The method according to claim 1, wherein the first performance value and the second performance value indicate an accuracy or reliability of the current version of the analytical procedure and the updated version of the analytical procedure, respectively.

4. The method according to claim 1, wherein the second monitoring device performs the current version of the analytical procedure on the monitoring data and sends the first result to the first monitoring device, which calculates the first performance value.

5. The method according to claim 1, wherein the first monitoring device sends the second result to the second monitoring device, and wherein the second monitoring device calculates the first performance value and the second performance value.

6. The method according to claim 1, further comprising transmitting, on condition that the evaluation indicates an improvement, the updated version of the analytical procedure to the second monitoring device.

7. The method according to claim 1, further comprising transmitting, on condition that the evaluation indicates an improvement, the updated version of the analytical procedure to a third monitoring device of the plurality of monitoring devices, wherein the second and third monitoring devices are arranged to monitor similar environments.

8. The method according to claim 1, wherein selecting the first monitoring device comprises identifying a monitoring device, out of the plurality of monitoring devices, having sufficient available processing resources for performing and evaluating the updated version of the analytical procedure.

9. The method according to claim 1, wherein the first monitoring device comprises first hardware for performing the updated version of the analytical procedure, wherein the second monitoring device comprises second hardware for performing the current version of the analytical procedure, wherein each of the first hardware and the second hardware comprise a hardware accelerator, a CPU or a GPU, and wherein the first hardware and the second hardware are of a similar type.

10. The method according to claim 1, wherein the updated version of the analytical procedure is performed using a deep learning model operating in a deep learning framework, and wherein at least one of the deep learning model and the deep learning framework is updated.

11. The method according to claim 1, wherein the current version of the analytical procedure and the updated version of the analytical procedure comprises object recognition.

12. An evaluation system for evaluating an updated version of an analytical procedure in a monitoring system comprising a plurality of monitoring devices, wherein at least some monitoring devices of the plurality of monitoring devices are arranged to monitor similar environments, the evaluation system being characterized by circuitry configured to execute:
an identifying function configured to identify available processing resources in the monitoring system;
a selecting function configured to select a first monitoring device out of the plurality of monitoring devices for which available processing resources have been identified, and further to select a second monitoring device out of the plurality of monitoring device;
a monitoring data acquiring function configured to acquire monitoring data using the second monitoring device;
a monitoring data sending function configured to send the monitoring data to the first monitoring device;
an analytical procedure performing function configured to perform a current version of the analytical procedure on the monitoring data, thereby producing a first result, and further to perform an updated version of the analytical procedure on the monitoring data, using the first monitoring device, thereby producing a second result;

a calculating function configured to calculate, based on the first result, a first performance value indicating a performance of the second monitoring device when performing the current version of the analytical procedure, and further to calculate, based on the second result, a second performance value indicating a performance of the first monitoring device when performing the updated version of the analytical procedure; and an evaluating function configured to evaluate the updated version of the analytical procedure based on a comparison between the first performance value and the second performance value.

13. The evaluation system according to claim 12, wherein the monitoring system comprises a camera system, the first monitoring device comprises a first camera and the second monitoring device comprises a second camera.

14. The evaluation system according to claim 12, wherein the monitoring system comprises at least one of:
   a radar system, wherein the first monitoring device comprises a first radar device and the second monitoring device comprises a second radar device, and
   an audio system, wherein the first monitoring device comprises a first audio device and the second monitoring device comprises a second audio device.

15. A non-transitory computer-readable medium having stored thereon computer code instructions adapted to carry out a method, when executed by a device having processing capability, the method for evaluating an updated version of an analytical procedure in a monitoring system comprising a plurality of monitoring devices, wherein at least some monitoring devices of the plurality of monitoring devices are arranged to monitor similar environments, the method comprising:
   identifying available processing resources in the monitoring system;
   selecting a first monitoring device out of the plurality of monitoring devices for which available processing resources have been identified;
   selecting a second monitoring device out of the plurality of monitoring devices;
   acquiring monitoring data by the second monitoring device;
   performing a current version of the analytical procedure on the monitoring data, thereby producing a first result;
   sending the monitoring data to the first monitoring device;
   performing, in the first monitoring device, an updated version of the analytical procedure on the monitoring data, thereby producing a second result;
   calculating, based on the first result, a first performance value indicating a performance of the second monitoring device when performing the current version of the analytical procedure;
   calculating, based on the second result, a second performance value indicating a performance of the first monitoring device when performing the updated version of the analytical procedure; and
   evaluating the updated version of the analytical procedure based on a comparison between the first performance value and the second performance value.

16. The non-transitory computer-readable medium according to claim 15, wherein the first performance value and the second performance value indicate a time, utilized power resources or utilized processing resources for performing the current version of the analytical procedure and the updated version of the analytical procedure, respectively.

17. The non-transitory computer-readable medium according to claim 15, wherein the first performance value and the second performance value indicate an accuracy or reliability of the current version of the analytical procedure and the updated version of the analytical procedure, respectively.

18. The non-transitory computer-readable medium according to claim 15, wherein the second monitoring device performs the current version of the analytical procedure on the monitoring data and sends the first result to the first monitoring device, which calculates the first performance value.

19. The non-transitory computer-readable medium according to claim 15, wherein the first monitoring device sends the second result to the second monitoring device, and wherein the second monitoring device calculates the first performance value and the second performance value.

20. The non-transitory computer-readable medium according to claim 15, further comprising transmitting, on condition that the evaluation indicates an improvement, the updated version of the analytical procedure to the second monitoring device.

* * * * *